: US 7,266,376 B2

(12) United States Patent
Nakagawa

(10) Patent No.: US 7,266,376 B2
(45) Date of Patent: Sep. 4, 2007

(54) METHOD AND DEVICE FOR PROVIDING INFORMATION RELATED TO ACTIVITY OF USER

(75) Inventor: Katsuya Nakagawa, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 655 days.

(21) Appl. No.: 09/987,143

(22) Filed: Nov. 13, 2001

(65) Prior Publication Data
US 2002/0058520 A1 May 16, 2002

(30) Foreign Application Priority Data
Nov. 13, 2000 (JP) ............... 2000-344946

(51) Int. Cl.
*H04Q 7/20* (2006.01)
(52) U.S. Cl. ............... 455/456.1; 455/434; 455/435.1; 455/433; 455/435.3; 455/457; 455/432; 455/566; 701/207; 701/208; 701/213; 701/212; 342/357.1; 342/357.09
(58) Field of Classification Search ............. 455/456.1, 455/456.5, 456.6, 457, 435.3, 432, 566, 456, 455/434, 435, 435.1, 433; 342/357.1, 357.13, 342/357.09, 357; 701/207, 208, 202, 213, 701/212; 713/733
See application file for complete search history.

(56) References Cited

U.S. PATENT DOCUMENTS

| 5,790,974 | A |   | 8/1998 | Tognazzini |   |
|---|---|---|---|---|---|
| 5,948,040 | A |   | 9/1999 | DeLorme et al. |   |
| 6,321,092 | B1 | * | 11/2001 | Fitch et al. | 455/456.5 |
| 6,707,421 | B1 | * | 3/2004 | Drury et al. | 342/357.1 |
| 6,925,603 | B1 | * | 8/2005 | Naito et al. | 715/733 |
| 2002/0164995 | A1 | * | 11/2002 | Brown et al. | 455/456 |

FOREIGN PATENT DOCUMENTS

| EP | 0 785 519 A1 | 7/1997 |
|---|---|---|
| EP | 0 921 511 A2 | 6/1999 |
| JP | A9-243382 | 9/1997 |
| JP | A10-13961 | 1/1998 |
| JP | A10-275296 | 10/1998 |
| JP | A10-281801 | 10/1998 |
| JP | 11-175878 | 7/1999 |
| JP | 2000-018957 | 1/2000 |
| JP | 2000-215211 A | 8/2000 |
| JP | 2000-258172 A | 9/2000 |

OTHER PUBLICATIONS

Merriam-Webster Online Dictionary.*
Hirohisa Naito et at., System Construction Using Navigation markup Language NVML, IPSJ SIG Notes, Japan, Information Processing Society of Japan, vol. 99, No. ITS-3, pp. 81-87 (Oct. 7, 1999).

* cited by examiner

*Primary Examiner*—Joseph Feild
*Assistant Examiner*—Randy Peaches
(74) *Attorney, Agent, or Firm*—Birch, Stewart, Kolasch & Birch, LLP

(57) ABSTRACT

An information providing system includes a mobile terminal and an information providing device. The mobile terminal includes a communication circuit transmitting positional information representing a position of the mobile terminal to the information providing device in response to an inquiry from the information providing device. The information providing device includes a storage circuit storing plan information representing a plan to be executed by the user of the mobile terminal, and a control circuit generating traveling information related to traveling for the user to execute the plan and transmitting the traveling information to the mobile terminal based on the positional information received from the mobile terminal and the plan information stored in the storage circuit. The mobile terminal further includes a display circuit displaying the traveling information received from the information providing device.

22 Claims, 11 Drawing Sheets

FIG.4

| USER ID | 001 | 002 |
|---|---|---|
| PHONE NUMBER | 090-1234-5678 | ... |
| USER NAME | TARO YAMADA | ... |
| E-MAIL ADDRESS | yamada@aaa.bbb.ne.jp | ... |
| PREFERENCE INFORMATION | SKI<br>TENNIS<br>CINEMA<br>TAIWANESE CUISINE<br>... | ... |

FIG.5

| USER ID | 001 | | 002 |
|---|---|---|---|
| RECEIVED TIME | 00/10/11 17:20:26 | | ... |
| POSITION | E.LONG. 139.42.17.5 N.LAT. 35.41.13.6 | | ... |
| WEATHER | RAIN | | ... |
| SCHEDULE | 10/11 07:10<br>10/11 07:10~11:30<br>10/11 13:10~16:30<br>10/11 19:20<br>10/12 10:00~12:00<br>... | HIKARI SUPER EXT 124 DEP<br>SALES MEETING<br>@HIBIYA OFFICE<br>MEETING W/A CORP.<br>@SHINJUKU<br>HIKARI SUPER EXT 312 DEP<br>PAT.MTG<br>@OSAKA HEADQUARTERS<br>... | ... |

FIG.6

| EVENT ID | EVENT NAME | LOCATION | SEARCH KEYWORD | WEATHER CONDITION | TIME REQUIRED |
|---|---|---|---|---|---|
| 1001 | EXHIBITION OF M.VLAMINCK. SHINJUKU ART MUSEUM | E.LONG. 139.44.56.7 N.LAT. 35.42.4.47 | PAINTING ART LATER IMPRESSIONISM | ANY | 2:00 |
| 1002 | STAND LIVE CONCERT ROCK FESTIVAL | E.LONG. 139.44.26.7 N.LAT. 35.44.4.2 | MUSIC ROCK | ANY BUT RAIN | 1:30 |
| 1003 | CUISINE CHINESE RESTAURANT "TAIPEI" | E.LONG. 139.47.16.7 N.LAT. 35.44.5.13 | CUISINE TAIWAN | ANY | 1:00 |
| ... | ... | ... | ... | ... | ... |

FIG.7

| EVENT ID | LOCATION NAME | LOCATION |
|---|---|---|
| 10001 | SHIN-OSAKA STA. | E.LONG.135.24.56.7 N.LAT.35.32.4.27 |
| 10002 | OSAKA HEADQUARTERS | E.LONG.13514.11.7 N.LAT.35.33.4.24 |
| 20001 | HIBIYA OFFICE | E.LONG.139.24.17.7 N.LAT.35.24.4.2 |
| 20002 | SHINJUKU A CORP. | E.LONG.139.57.16.7 N.LAT.35.44.5.3 |
| 20003 | SHINJUKU STA. | E.LONG.139.47.56.7 N.LAT.35.48.5.13 |
| 20004 | TOKYO STA. | E.LONG.139.37.36.7 N.LAT.35.44.5.3 |

FIG.11

|  | NEXT PLAN | LOCATION OF NEXT PLAN | CURRENT POSITION |
|---|---|---|---|
| SEARCH CONDITION | 19:20 SHINKANSEN ON BOARD | TOKYO STA. | E.LONG.139.42.17.5<br>N.LAT. 35.41.13.6 |

FIG.12

|  | CURRENT LOCATION | TRANS-PORTATION | CLOSEST STA. | LINE/ TRAIN | LOCATION OF NEXT PLAN |
|---|---|---|---|---|---|
| SEARCH RESULT | 3-3 SHINJUKU-KU 18:40 | WALK | SHINJUKU STA. 18:50 | CHUO-LINE SUPER EXP | TOKYO STA. 19:03 |

FIG.13

|  | NEXT PLAN | LOCATION OF NEXT PLAN | CURRENT POSITION |
|---|---|---|---|
| SEARCH CONDITION | 19:20 SHINKANSEN ON BOARD | TOKYO STA. | E.LONG.139.47.16.7<br>N.LAT. 35.44.5.13 |

FIG.14

|  | CURRENT LOCATION | TRANS-PORTATION | CLOSEST STA. | LINE/ TRAIN | LOCATION OF NEXT PLAN |
|---|---|---|---|---|---|
| SEARCH RESULT | 6-6 SHINJUKU-KU 18:30 | WALK | SHINJUKU STA. 18:50 | CHUO-LINE SUPER EXP | TOKYO STA. 19:03 |

METHOD AND DEVICE FOR PROVIDING INFORMATION RELATED TO ACTIVITY OF USER

BACKGROUND OF THE INVENTION

1. Field of the Invention

The present invention relates to an art of transmitting information from an information providing device to a terminal, and particularly, to an art of acquiring positional information from a mobile terminal and transmitting information that is related to the positional information of the mobile terminal and that is related to an activity of a user of the mobile terminal.

2. Description of the Background Art

A car navigation device is known that adds positional information to map information based on a current position of a mobile unit. Another system is known in which map information is stored into an information-center computer capable of wireless communication with a mobile terminal, instead of being stored on the car navigation device side, to receive a current position of the mobile terminal, and to transmit map information concerning the neighborhood area of the received current position. Still another system is known in which, in addition to map information, information of a facility is provided such as a restaurant in the neighborhood of the received current position.

Japanese Patent Laying-Open No. 10-13961 discloses a mobile communication system related to such systems above. The disclosed mobile communication system includes a mobile terminal and an information-center computer. The mobile terminal includes a positional information detection circuit detecting positional information of itself, a positional information transmission circuit transmitting the positional information to the information-center computer, an upload data transmission circuit transmitting upload data to the information-center computer, and an information providing circuit providing the user with information from the information-center computer. The information-center computer includes a storage circuit storing information, a search circuit receiving the positional information from the mobile terminal and searching for information stored in the storage circuit, a storage control circuit storing the upload data into the storage circuit, and an information transmission circuit reading information retrieved by the search circuit and transmitting the read information to the mobile terminal.

The upload data transmission circuit transmits information related to the positional information, as upload data, to the information-center computer. The information providing circuit provides the user with information related to the positional information transmitted from the information-center computer. The storage circuit stores information about the area within a moving range of the mobile terminal. The search unit receives the positional information transmitted from the mobile terminal and searches for information related to the positional information stored in the storage circuit. The storage control circuit stores the information transmitted from the upload data transmission circuit included in the mobile terminal into the storage circuit. The information transmission circuit reads out the information related to the positional information retrieved by the search circuit, and transmits the information related to the positional information to the mobile terminal. Thus, the mobile terminal transmits the positional information of the terminal itself to the information-center computer, so that the user of the mobile terminal can be provided with the information stored in the storage circuit of the information-center computer in connection with the received positional information.

Moreover, the mobile terminal transmits information related to the positional information through the upload data transmission circuit, so that the information stored in the information-center computer can be updated anytime. As a result, not only map information showing a current position of the mobile terminal, but also detailed information related to the positional information, such as facilities on the map (e.g. a telephone number and business hours of a facility) can be obtained.

The mobile communication system disclosed in the publication described above merely provides information related to positional information in response to reception of the positional information from the mobile terminal. The user who received the information service must determine for his/herself if he/she has time to go to a facility provided by the information, or if he/she is interested in the facility.

SUMMARY OF THE INVENTION

An object of the present invention is to provide a method and a device for providing beneficial information related to a position of a mobile terminal.

Another object of the present invention is to provide a method and a device for providing beneficial information related to an activity planned by a user of a mobile terminal.

A further object of the present invention is to provide a method and a device for providing information assisting execution of an activity planned by a user of a mobile terminal.

A yet further object of the present invention is to provide a method and a device for providing information suggesting another activity when an activity planned by a user of a mobile terminal is different from an actual activity.

An another object of the present invention is to provide a method and a device for providing information suggesting another activity satisfying a user's preference when an activity planned by the user of a mobile terminal is different from an actual activity.

A yet another object of the present invention is to provide a method and a device for providing information suggesting another activity suitable for an environment when an activity planned by a user of a mobile terminal is different from an actual activity.

According to an aspect of the present invention, an information providing device is used in an information providing system including a mobile terminal and an information providing device. The mobile terminal transmits positional information representing a position of the mobile terminal, and outputs information received from the information providing device. The information providing device includes a communication circuit communicating with the mobile terminal, a first storage circuit storing plan information representing a plan to be executed by a user of the mobile terminal, and a control circuit connected to the communication circuit and the first storage circuit to control the information providing device. The control circuit includes a circuit controlling a communication circuit such that information related to an activity for executing the plan is transmitted to the mobile terminal, based on the positional information received from the mobile terminal and the plan information stored in the first storage circuit.

The mobile terminal transmits positional information representing the position of itself, in response to an inquiry from the information providing device, or transmits such positional information to the information providing device on a regular basis. The information providing device can provide the mobile terminal with information about an activity such as traveling from a current position based on the received positional information to a location where the next plan is executed. The mobile terminal can display the information about the activity such as traveling from the current position to the location of the next plan. The information providing device can provide the mobile terminal with information that is related to the positional information of the user of the mobile terminal and that is related to an activity of the user.

Preferably, the plan information includes location information representing a location where the plan is executed (hereinafter also referred to as an execution location). The control circuit includes a circuit searching for a route of traveling from a position of the mobile terminal to the execution location, based on the positional information and the location information; and a circuit controlling the communication circuit such that information representing the route of traveling is transmitted to the mobile terminal.

The information providing device stores, as plan information, location information representing e.g. a location where a meeting is held. If the positional information representing the current position received from the mobile terminal disagrees with the location information representing the location where the meeting is to be held, the information providing device can search for a route of traveling from the current position to the location where the meeting is to be held, and transmit the information of the route to the mobile terminal to provide the user of the mobile terminal with the information.

More preferably, the plan information includes location information representing a location where the plan is executed and time information representing time at which the plan is executed (hereinafter also referred to as execution time). The control circuit includes a circuit searching for a route of traveling from a position of the mobile terminal to the execution location, based on the positional information and location information; a circuit calculating time required for the traveling, based on the execution time and the route; and a circuit controlling the communication circuit such that information representing the route of traveling and information representing the time required for traveling are transmitted to the mobile terminal.

The information providing device stores, as plan information, e.g. location information representing a location where a meeting is held and time information representing start time of the meeting. When the positional information representing the current position received from the mobile terminal disagrees with the location information representing a location where the meeting is to be held, the information providing device can search for a route of traveling from the current position to the location where the meeting is to be held, calculate time required for traveling in order for the user to be in time for the start time of the meeting, and transmit these information to the mobile terminal to provide the user of the mobile terminal with the information.

More preferably, the information providing device further includes a second storage circuit storing event information in connection with a location where an event is to be held and time required for executing the event. The control circuit further includes a circuit calculating spare time before start of traveling based on the time required for traveling; a circuit conducting a search for an event that can be executed by a user of the mobile terminal, from event information stored in the second storage circuit, based on the spare time, the positional information, the location where the event is to be held, and the time required for execution of the event; and a circuit controlling the communication circuit such that event information representing the event retrieved as a result of the search is transmitted to the mobile terminal.

When there is spare time before the start time of traveling for executing the next plan, the information providing device searches for an event that can be executed in the spare time, including an event such as a concert for which start time is set in advance, and an event such as visiting of a scenic site that has no such time constraint. The information providing device can provide the user of the mobile terminal with event information representing the event retrieved as a result of the search.

More preferably, the information providing device further includes a second storage circuit storing event information in connection with a location where an event is held, time required for execution of the event, and a detail of the event; and a third storage circuit storing preference information representing a preference of the user. The control circuit further includes a circuit calculating spare time before start of traveling, based on the time required for traveling; a circuit conducting a search for an event that can be executed by a user of the mobile terminal, from event information stored in the second storage circuit, based on the spare time, the positional information, the location where the event is to be held, the time required for execution of the event, and a degree of matching between the preference information and the detail of the event; and a circuit controlling the communication circuit such that event information representing the event retrieved as a result of the search is transmitted to the mobile terminal.

When there is spare time before the start time of the traveling for executing the next plan, the information providing device searches for an event that can be executed in the spare time and that matches the user's preference. The information providing device can provide the user of the mobile terminal with event information representing the event retrieved as a result of the search that matches with the user's preference.

More preferably, the information providing device further includes a search circuit searching for weather information representing weather; and a second storage circuit storing event information in connection with a location where an event is held, time required for execution of the event, and weather suitable for the event. The control circuit further includes a circuit searching for weather information representing weather at a position specified by the positional information, using the search circuit; a circuit calculating spare time before start of traveling based on the time required for traveling; a circuit conducting a search for an event that can be executed by an user of the mobile terminal, from event information stored in the second storage circuit, based on the spare time, the positional information, the location where the event is held, the time required for execution of the event, and a degree of matching between the weather information and the weather suitable for the event; and a circuit controlling the communication circuit such that event information representing the event retrieved as a result of the search is transmitted to the mobile terminal.

When there is spare time before the start time of traveling for executing the next plan, the information providing device searches for an event that can be executed in the spare time, and that matches with the weather at that time point or a time point in the near future. The information providing device can provide the user of the mobile terminal with event information representing the event that matches with the weather.

According to another aspect of the present invention, an information providing method provides a mobile terminal with information. The method includes the steps of preparing plan information representing a plan to be executed by a user of the mobile terminal; receiving positional information representing a position of the mobile terminal from the mobile terminal; generating information related to an activity for executing the plan, based on the plan information prepared at the step of preparing the plan information; and transmitting to the mobile terminal the activity-related information generated at the step of generating the information related to the activity.

The mobile terminal transmits positional information representing a position of itself to an information providing device. The information providing method can provide the mobile terminal with information about an activity such as traveling from a current position based on the received positional information to a location where the next plan is executed. The mobile terminal can display information about the activity such as traveling from the current position to the location where the next plan is executed. The information providing method can provide the mobile terminal with information that is related to the positional information of the user of the mobile terminal and that is related to an activity of the user.

According to a further aspect of the present invention, a recording medium is a computer-readable recording medium in which a program is stored that can implement an information providing method providing a mobile terminal with information, using a computer. The information providing method includes the steps of preparing plan information representing a plan to be executed by a user of the mobile terminal; receiving positional information representing a position of the mobile terminal from the mobile terminal; generating information related to an activity for executing the plan based on the positional information received at the step of receiving the positional information and the plan information prepared at the step of preparing the plan information; and transmitting to the mobile terminal the activity-related information generated at the step of generating the information related to the activity.

The mobile terminal transmits positional information representing a position of itself to an information providing device. The information providing method can provide the mobile terminal with information concerning an activity such as traveling from a current position based on the received positional information to a location where the next plan is executed. The mobile terminal can display information concerning the activity such as traveling from the current position to the location where the next plan is executed. The recording medium can provide the mobile terminal with a program making a computer implement an information providing method providing information that is related to the positional information of a user of the mobile terminal and that is related to an activity of the user.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows user data stored in a hard disk of the server;

FIG. 5 shows schedule data stored in the hard disk of the server;

FIG. 6 shows event data stored in the hard disk of the server;

FIG. 7 shows coordinate data stored in the hard disk of the server;

FIGS. 11 and 13 show search conditions for a traveling route;

FIGS. 12 and 14 show search results of a traveling route;

DESCRIPTION OF THE PREFERRED EMBODIMENT

Figure 1:
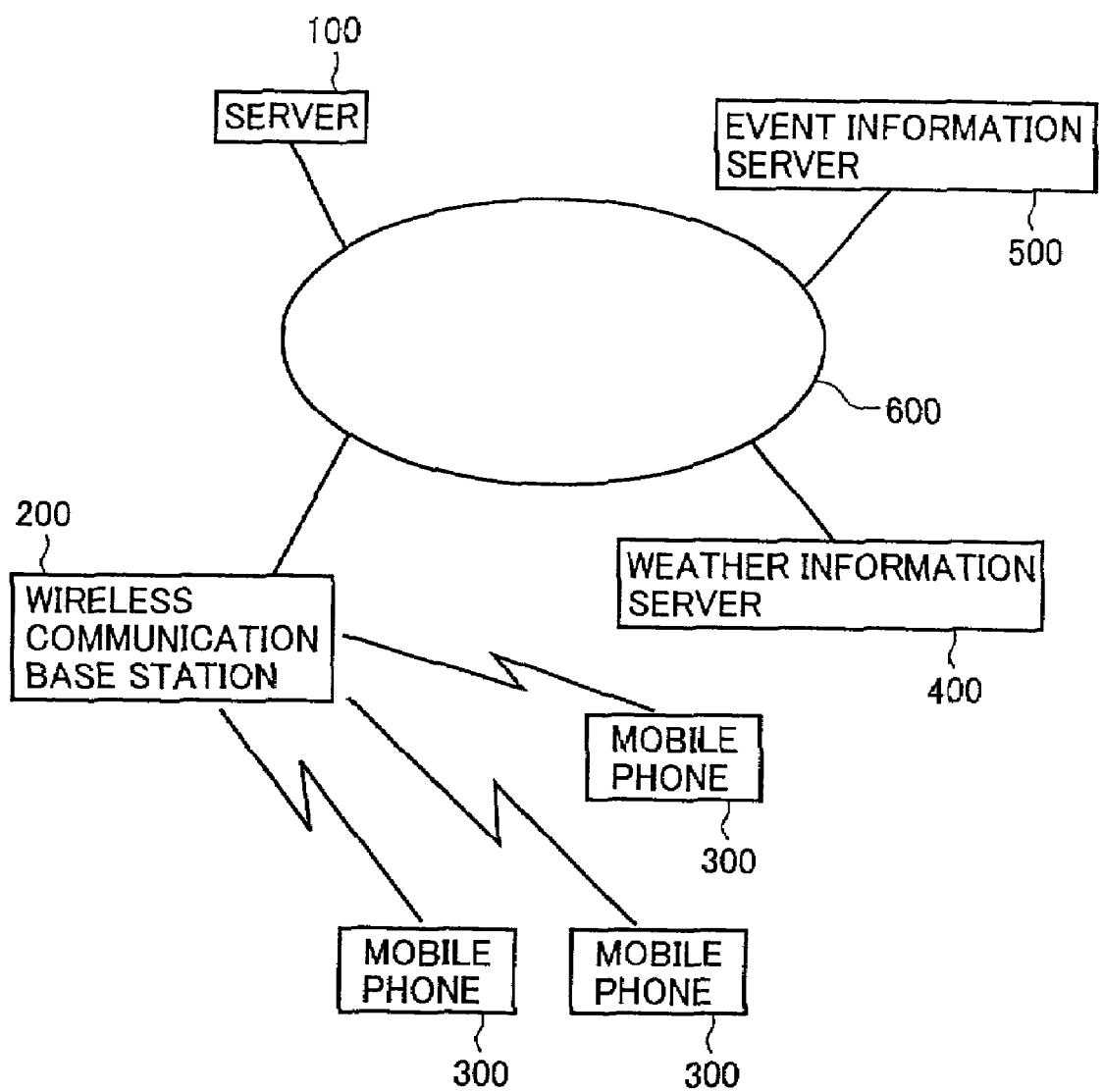
FIG. 1 is a general view of the configuration of an information providing system according to an embodiment of the present invention.

An embodiment of the present invention will be described below with reference to the drawings. In the description below and the drawings, similar components are denoted by the same reference characters. The same applies to the names and functions thereof. Therefore, detailed description thereof will not be repeated where appropriate.

Referring to FIG. 1, the configuration of an information providing system according to the present embodiment is described. The information providing system according to the present embodiment includes a server 100, mobile telephones 300, a wireless communication base station 200 for mobile telephones 300, a weather information server 400, an event information server 500, and a network 600 connecting server 100, wireless communication base station 200, weather information server 400 and event information server 500.

Weather information server 400 transmits weather information of various parts of the country in response to a request from server 100. Event information server 500 transmits event information of various parts of the country in response to a request from server 100.

Each mobile telephone 300 has a function that can detect a position of itself by e.g. the GPS (Global Positioning System). Mobile telephones 300 are connected to server 100 via wireless communication base station 200. Mobile phones 300 can communicate with one another via wireless communication base station 200.

Server 100 issues a request for weather information and event information to weather information server 400 and event information server 500 on a regular basis, and stores the weather information and event information received from weather information server 400 and event information server 500 into a hard disk.

A process at server 100 in the information providing system according to the present embodiment can be implemented by a software executed on a computer such as a personal computer or a work station.

Figure 2:
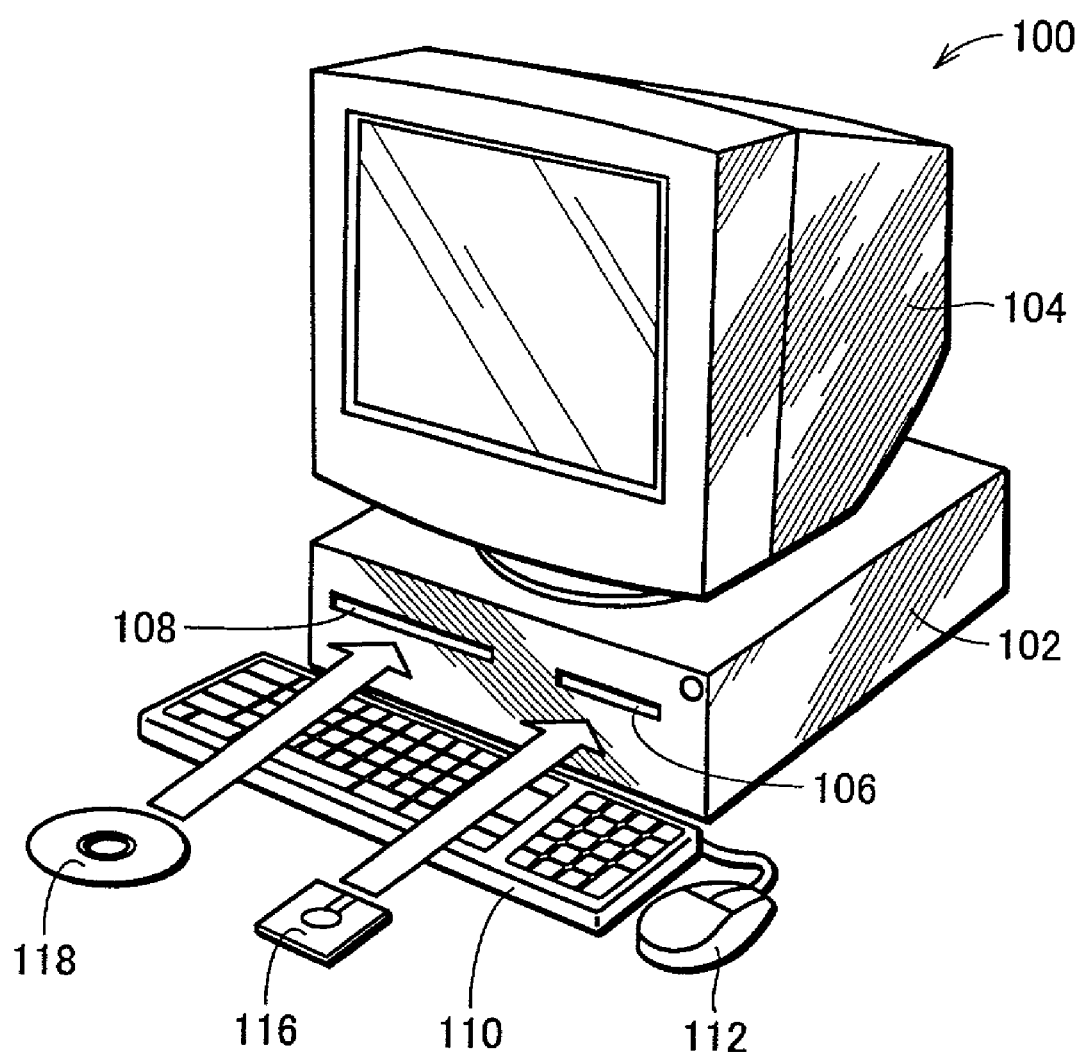
FIG. 2 is an outline view of a computer implementing a server according to the embodiment of the present invention.

FIG. 2 shows an outline of a computer system as an example of server 100. Referring to FIG. 2, the computer system includes a computer 102 having an FD (Flexible Disk) driving unit 106 and a CD-ROM (Compact Disc Read-Only Memory) driving unit 108, a monitor 104, a keyboard 110, and a mouse 112.

Figure 3:
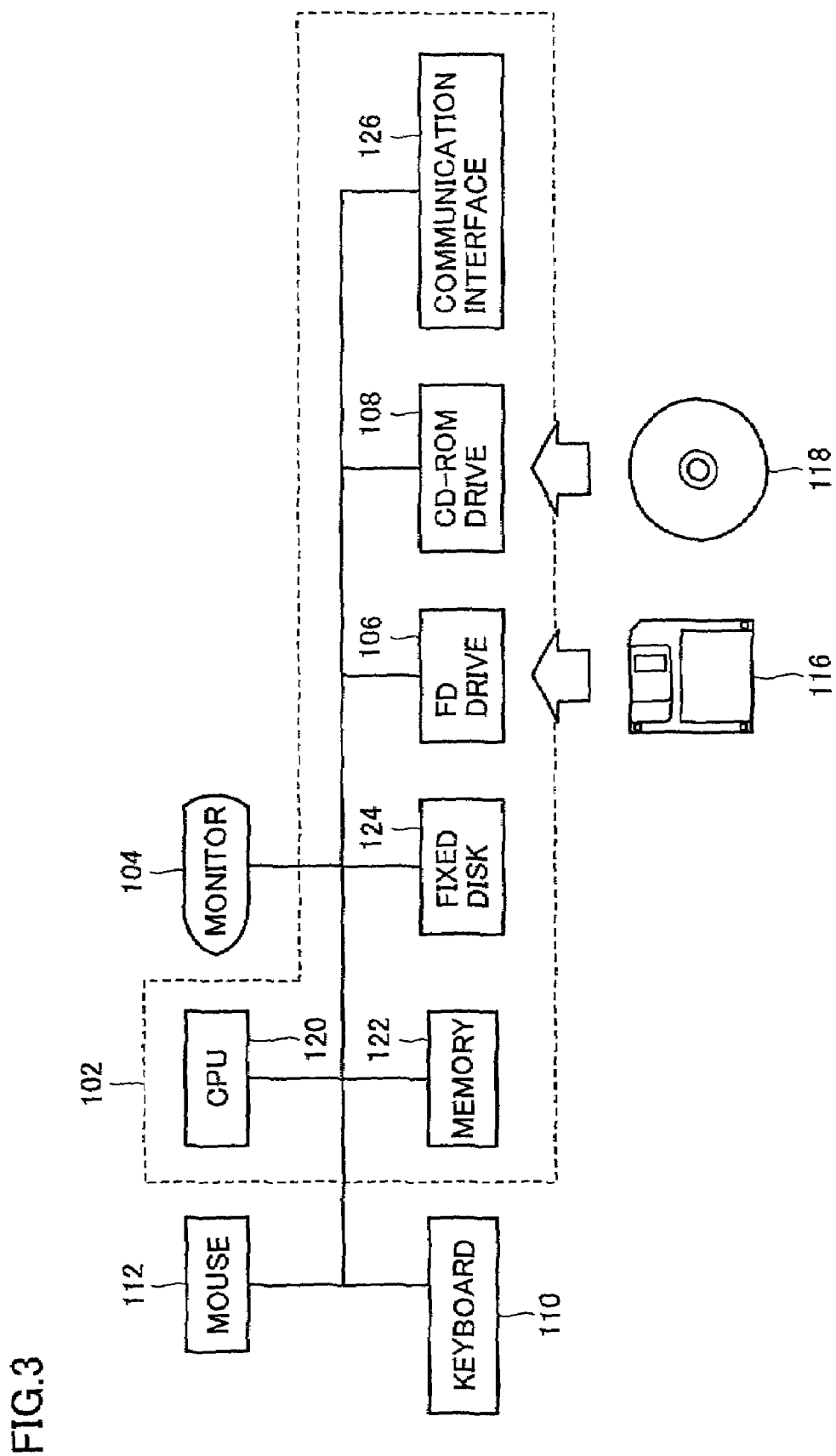
FIG. 3 is a control block diagram of the computer.

FIG. 3 shows the configuration of the computer in a form of a block diagram. As shown in FIG. 3, computer 102 includes, in addition to FD driving unit 106 and CD-ROM driving unit 108 described above, a CPU (Central Processing Unit) 120, a memory 122 and a hard disk 124, which are interconnected via a bus. An FD 116 is mounted into FD driving unit 106. A CD-ROM 118 is mounted into CD-ROM driving unit 108.

The server in the information providing system can be implemented by a software executed by a computer hardware and CPU 120. Such a software is generally stored in a recording medium such as FD 116 and CD-ROM 118 to be distributed, and is read from the recording medium by FD driving unit 106 or CD-ROM driving unit 108 to be stored into hard disk 124. The software is further read from hard disk 124 into memory 122, and is executed by CPU 120. The hardware itself of the computer shown in FIGS. 2 and 3 is a generic one. Thus, the most essential part of the present invention is the software recorded in the recording medium such as FD 116, CD-ROM 118 or hard disk 124. It is noted that the operation of the computer itself shown in FIGS. 2 and 3 is well known, so that the detailed description thereof will not be repeated here.

Referring to FIG. 4, user data stored in hard disk 124 of server 100 according to the present embodiment is described. As shown in FIG. 4, user data includes, per user ID (identification) for identifying a user in the information providing system, a telephone number, a user name, and an electronic mail (hereinafter referred to as E-mail) address, and preference information of the user. In the information providing system, mobile phone 300 transmits the telephone number of itself to server 100 using a caller ID service while transmitting coordinate data to the server as positional information of mobile phone 300 itself. Server 100 can identify a user based on the telephone number received through the caller ID service.

Referring to FIG. 5, on-line data stored in hard disk 124 includes, per user ID, time at which the most recent positional coordinate data is received, coordinate data of a current position, weather data of the current position, and schedule data entered in advance by the user. It can be seen that, for example, for the user represented by the user ID of "001," coordinate data of 139 degrees 24 minutes 17.5 seconds east longitude and 35 degrees 41 minutes 13.6 seconds north latitude was received at 17:20:26. The data indicates the latest positional information. Server 100 can recognize, based on the received time and schedule data, that the next plan is to "go on board Hikari super express No. 312 departing from Tokyo station at 19:20."

Referring to FIG. 6, event data stored in hard disk 120 is described. The event data includes, per event ID for identifying an event stored in hard disk 120 of server 100, an event name, coordinate data of a location where the event is to be held, a search keyword indicating details of the event, a weather condition, and data indicating time required for execution of the event. For example, the event represented by event ID of "1002" is a "stand live concert, rock festival," and is held at 139 degrees 44 minutes 26.7 seconds east longitude and 35 degrees 44 minutes 4.2 seconds north latitude. Moreover, as search keywords for the event, "music" and "rock" are set. As a weather condition of the event, "any but rain" is stored, and "1 hour 30 minutes" is stored as the time required for executing the event.

Referring to FIG. 7, coordinate data stored in hard disk 120 is described. The coordinate data includes coordinates indicating a location written in the schedule data of the user. The coordinate data is transmitted from mobile phone 300, so that server 100 can locate the current position based on the received coordinate data. As a result, server 100 can determine weather or not the user of mobile phone 300 has already moved to the location where the next plan is to be executed.

Figure 8:
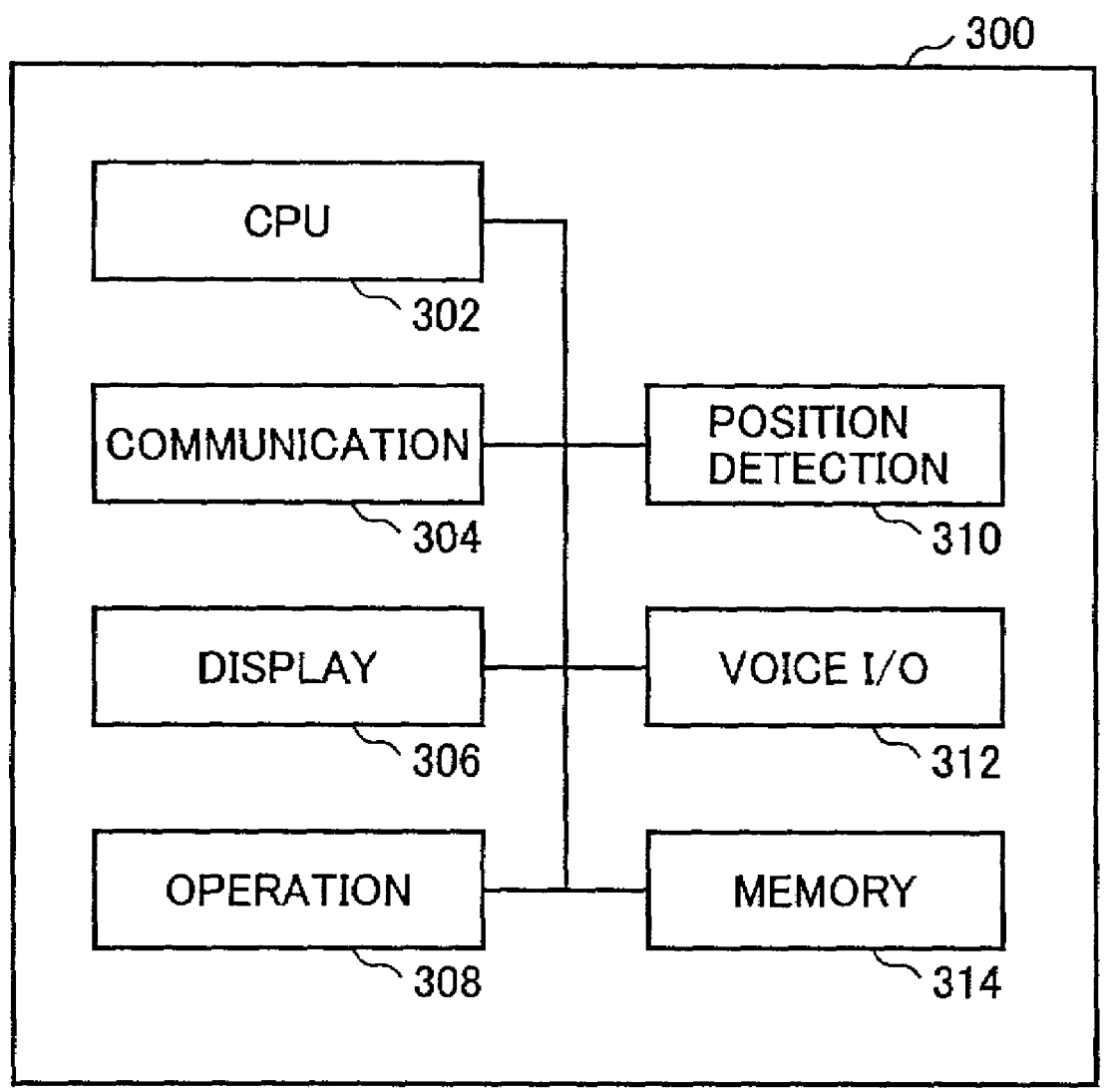
FIG. 8 is a control block diagram of a mobile telephone according to the embodiment of the present invention.

Referring to FIG. 8, mobile phone 300 according to the present embodiment is described. As shown in FIG. 8, mobile phone 300 includes a CPU 302 controlling the entire mobile phone 300, a communication unit 304 communicating with wireless communication base station 200, a display unit 306 displaying an E-mail and the like received from server 100, an operation unit 308 such as a numeric key pad from which a telephone number of a receiving end is entered, a position detection unit 310 detecting positional information (coordinate data) of itself by a GPS function or the like, a voice I/O (input/output) unit 312 outputting voice from the other end of the line and/or outputting synthetic voice transmitted from server 100, and a memory 314 storing a program executed at CPU 302 and intermediate data or the like of the program.

As for positional detection unit 310, a method of detection is not limited to the one implemented by the GPS, and any other methods that can detect a position of mobile phone 300 may be used.

Figure 9:
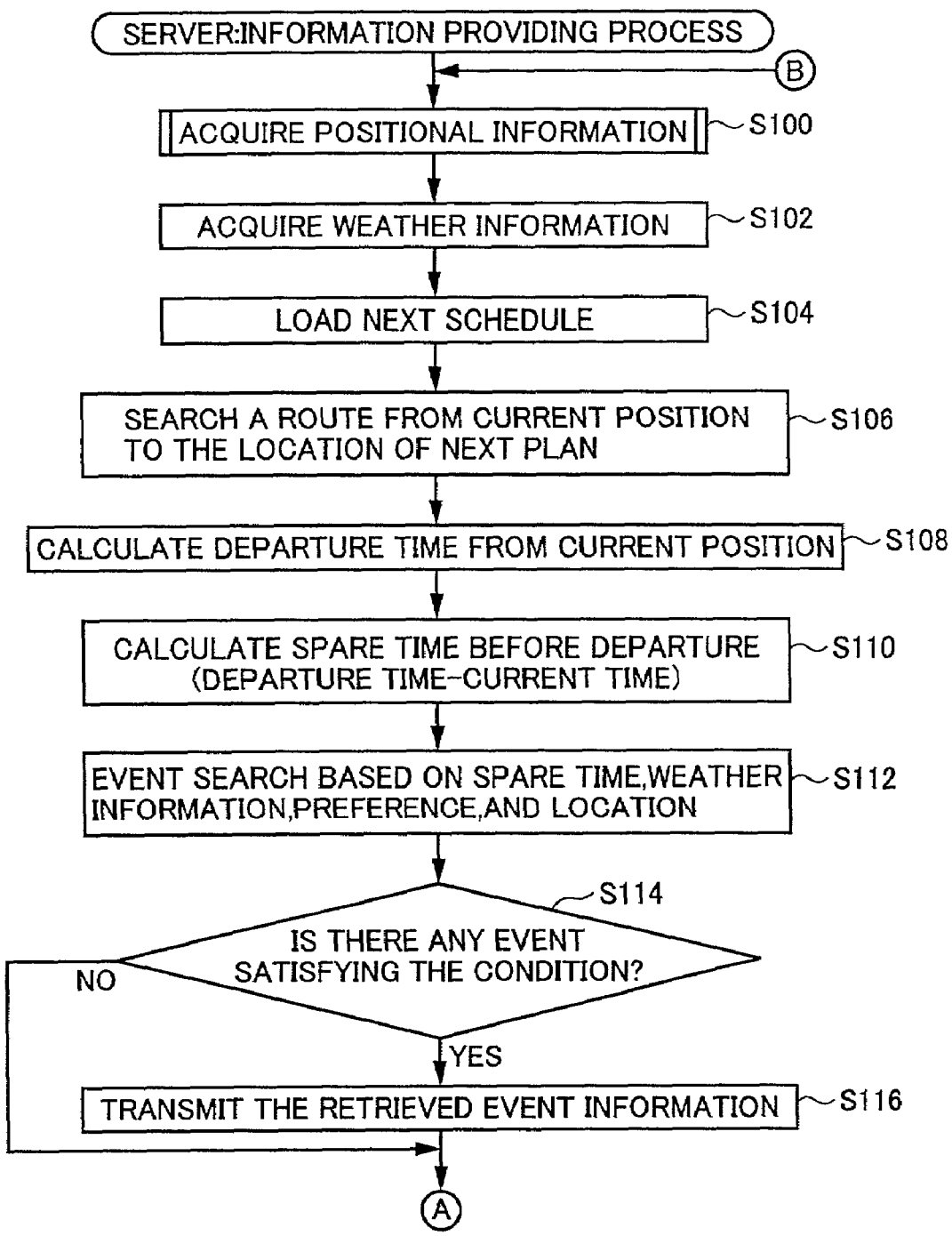
FIGS. 9 and 10 show a flow chart illustrating a control procedure of an information providing process at the server according to the embodiment of the present invention.

Referring to FIG. 9, a program executed at server 100 according to the present embodiment relates to an information providing process, and has a control structure as described below.

At step (hereinafter simply referred to as S) 100, CPU 120 acquires positional information from mobile phone 300. Details of process of acquiring the positional information at S100 will be described later with reference to FIG. 10.

At S102, CPU 120 reads out weather information from a prescribed area of hard disk 124. Here, weather information of a region including a location specified by the positional information acquired from mobile phone 300 is read out. At S104, CPU 120 reads out the next plan from the schedule data (FIG. 5) based on current time.

At S106, CPU 120 searches for a traveling route to the location where the next plan is executed, based on the positional information (coordinate data) of the received current position. The search is conducted by setting the current position as a departure point, the location where the next plan is executed as a destination, and the start time of the next plan as targeted arrival time, to search for a route from the current position to the destination.

At S108, CPU 120 calculates time of departure from the current position based on the traveling route retrieved as a result of the search. At S110, CPU 120 calculates spare time at the current position (=departure time−current time) based on the calculated departure time.

At S112, CPU 120 searches for an event satisfying the condition, from the event data (FIG. 6), based on the calculated spare time, the read weather information, the preference information contained in the user data (FIG. 4), and the acquired location information. At S114, CPU 120 determines whether or not there is an event satisfying the search condition. If there is an event satisfying the search condition (YES at S114) the process is moved on to S116. If not (NO at S114), the process is moved on to S118 in FIG. 10. At S116, CPU 120 transmits the event information retrieved as a result of the search to mobile phone 300.

Figure 10:
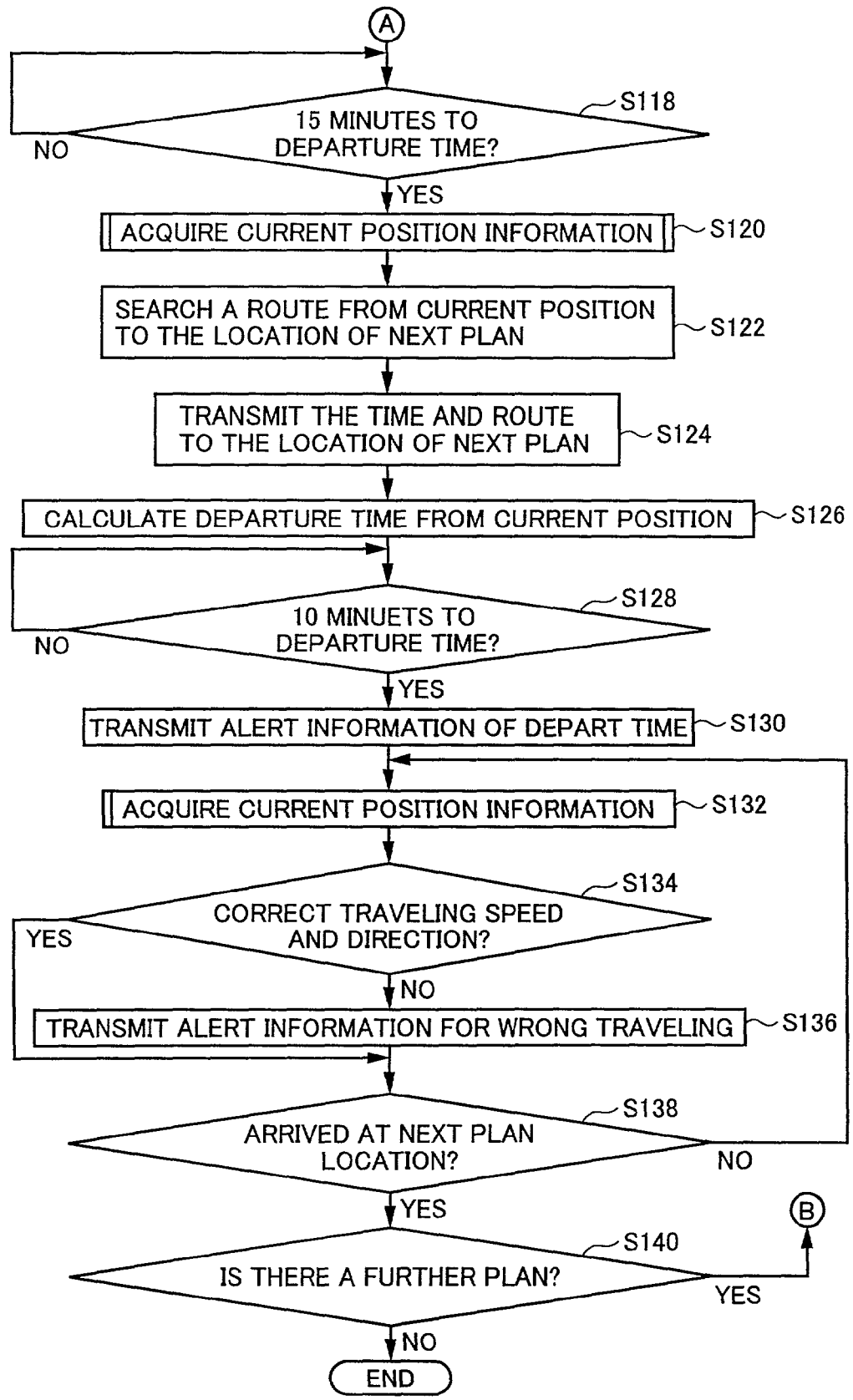

Referring to FIG. 10, at S118, CPU 120 determines whether or not it is 15 minutes to the calculated departure time. It is assumed that the schedule data shown in FIG. 5 is stored at intervals of at least approximately one hour. When it is 15 minutes to the departure time (YES in S118), the process is moved on to S120, and CPU 120 acquires positional information from mobile phone 300 as performed in the process at S100. If not (NO in S118), the process goes back to S118, and waits until it is 15minutes to the departure time.

At S122, CPU 120 searches for a traveling route to the location where the next plan is to be executed, based on the positional data of the current position acquired at S120. The process at S122 is similar to the process at S106 described earlier.

At S124, CPU 120 transmits a traveling route and traveling time retrieved as a result of the search at S112. At S126, CPU 120 calculates the time of departure from the current position acquired at S120.

At S128, it is determined whether or not it is 10 minutes to the departure time calculated at S126. If it is 10 minutes to the departure time (YES at S128), the process is moved on to S130. If not (NO at S128), the process goes back to S128, and waits until it is 10 minutes to the departure time.

At S130, CPU 120 transmits departure alert information to mobile phone 300. At S132, CPU 120 acquires positional information from mobile telephone 300. The process at S130 is similar to the process at S100 or S120 described earlier.

At S134, CPU 120 determines whether or not traveling speed and traveling direction are correct, based on the positional data acquired at predetermined time intervals. Here, acquisition of the current position is repeated at predetermined time intervals. The traveling speed and direction are calculated based on a distance traveled within a separatelydetermined time period. It is determined whether or not the calculated traveling speed is too slow, and whether or not the traveling direction is directed to the destination. If the traveling speed and direction are correct (YES at S134), the process is moved on to S138. If not (NO at S134), the process is moved on to S136.

At S136, CPU 120 transmits traveling alert information to mobile phone 300. At S138, CPU 120 determines, from a result of acquisition of the positional information, whether or not mobile phone 300 has arrived at the position at which the next plan is executed. If mobile phone 300 has arrived at the position at which the next plan is to be executed (YES at S138) the process is moved on to S140. If not (No at S138), the process goes back to S130, and S132 to S138 are repeated.

At S140, CPU 120 determines whether or not there is a further plan to be executed, based on the schedule data shown in FIG. 5. If there is a further plan to be executed (YES at S140), the process goes back to S100 in FIG. 9. If not (NO at S140), the information providing process is terminated.

The searching process performed at S106 in FIG. 9 and S122 in FIG. 10 is described. At S106 in FIG. 9, as shown in FIG. 11 for example, when the next plan is to "go on board a Shinkansen bullet train at 19:20," and the location where the next plan is executed is at "the Tokyo station" and the coordinate data of the current position is at 139 degrees 42 minutes 17.5 seconds east longitude and 35 degrees 41 minutes 13.6 seconds north latitude, a traveling route from the current position and traveling time are shown for the mobile phone to arrive at the Tokyo station before 19:20. As shown in FIG. 12, as a result of the search, the traveling route and traveling time are retrieved as follows: "the user of the mobile phone departs from the current position (i.e. near 3-3 Shinjuku) at 18:40, walks for 10 minutes to the Shinjuku station, and gets on the super express train of Chuo line departing from the Shinjuku station at 18:50, to arrive at the Tokyo station at 19:03.

In accordance with such search results, an event is searched for at S112, and a searching process for the travelling route and time is executed again at S122 in FIG. 10, assuming that the user has moved from the current position shown in FIG. 11 according to the event retrieved as a result of the event search.

As shown in FIG. 13, it is assumed that the user has moved from the current position described earlier to the location at 139 degrees 47 minutes 16.7 seconds east longitude and 35 degrees 44 minutes 5.13 seconds north latitude for participating an event. At the time point where it is 15 minutes to the departure time retrieved as a result of the search described above, new traveling route and traveling time from the current position to the location where the next plan is executed are searched for, and new departure time of 18:30 is calculated as shown in FIG. 14. It is noted that, at S112, an event is searched for, which is held within an area that can be reached in 15 minutes or less from the current position.

Figure 15:
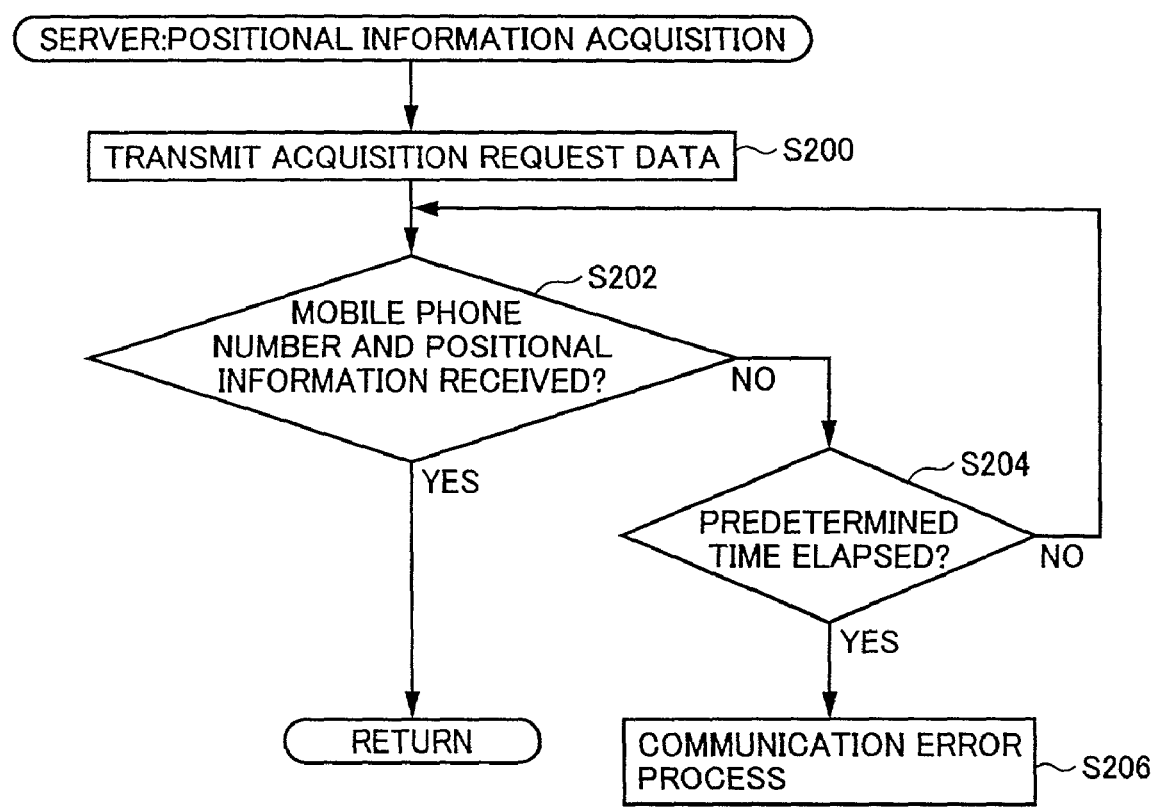
FIG. 15 is a flow chart showing a control procedure of a positional information acquiring process at the server according to the embodiment of the present invention.

Referring to FIG. 15, a program executed at server 100 according to the present embodiment relates to a positional information acquiring process, and has a control structure as described below.

At S200, CPU 120 transmits acquisition request data to all mobile phones 300 registered in the information providing system. At S202, CPU 120 determines whether or not a telephone number is received through the caller ID service, and whether or not positional information (coordinate data) detected by position detection unit 310 of mobile phone 300 is received. If the mobile telephone number and positional information are received (YES at S202), the positional information acquiring process is terminated. If not (NO at S202), the process is moved on to S204.

At S204, CPU 120 determines whether or not a predetermined time period has elapsed after transmission of the acquisition request data. If the predetermined time has elapsed (YES at S204), the process is moved on to S206, where a communication error process is performed. If not (NO at S204), the process goes back to S202, to wait for reception of the mobile telephone number and positional information from mobile phone 300.

Figure 16:
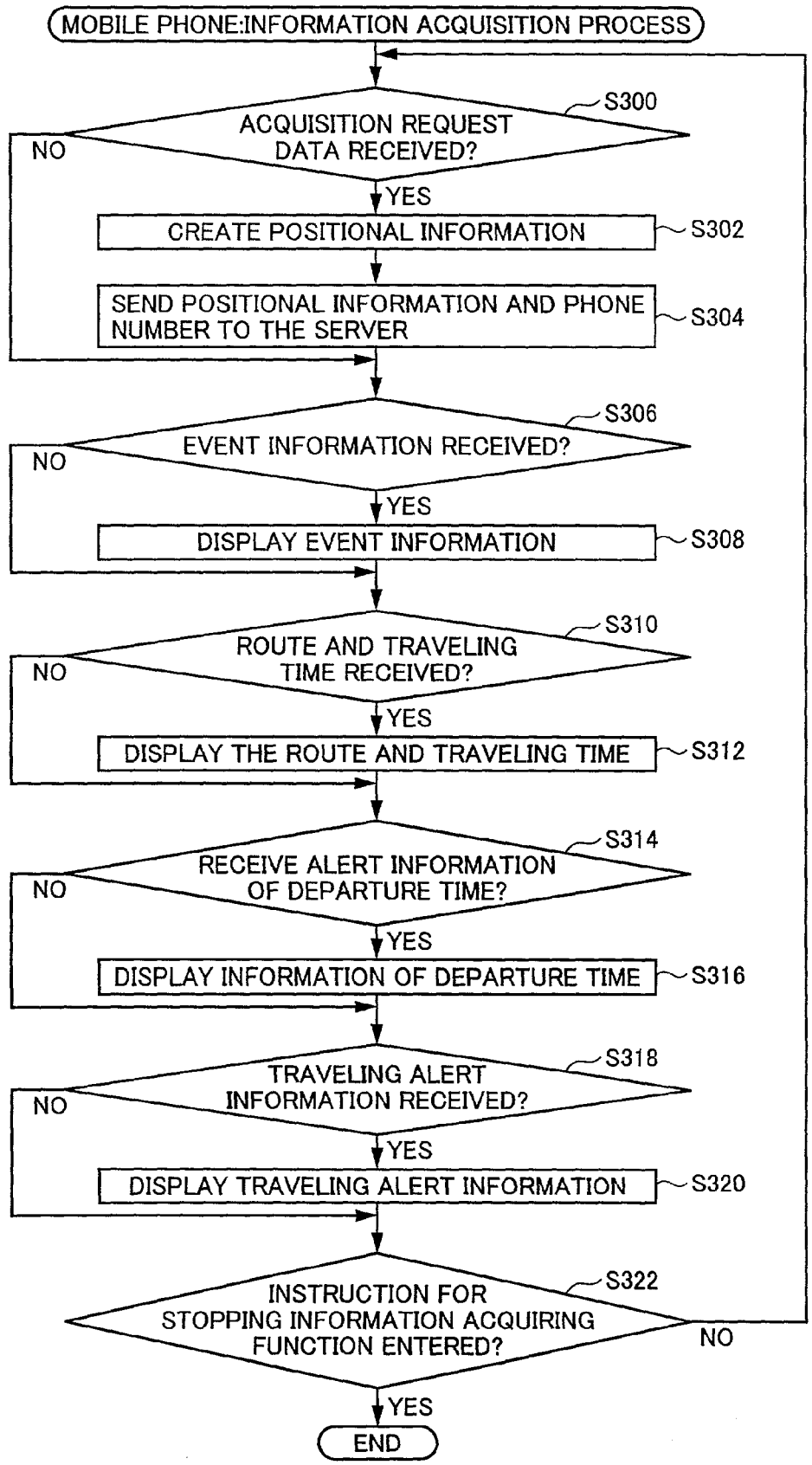
FIG. 16 is a flow chart showing a control procedure of an information acquiring process at the mobile telephone according to the embodiment of the present invention.

Referring to FIG. 16, a program executed at mobile phone 300 according to the present embodiment relates to an information acquisition process, and has a control structure as described below.

At S300, CPU 302 determines whether or not acquisition request data is received from server 100. If the acquisition request data is received from server 100 (YES at S300), the process is moved on to S302. If not (NO at S300), the process is moved on to S306.

At S302, CPU 302 creates positional information (coordinate data) indicating the current position detected by position detection unit 310. At S304, CPU 302 transmits the telephone number of itself and the positional information created at S302 to server 100.

At S306, CPU 302 determines whether or not event information is received from server 100. If the event information is received from server 100 (YES at S306), the process is moved on to S308. If not (NO at S306), the process is moved on to S310.

At S308, CPU 302 displays event information received at S306 on to display unit 306.

At S310, CPU 302 determines whether or not the traveling route and traveling time are received from server 100. If the traveling route and traveling time are received from server 100 (YES at S310), the process is moved on to S312. If not (NO at S310), the process is moved on to S314.

At S312, CPU 302 displays the traveling route and traveling time received at S310 onto display unit 306.

At S314, CPU 302 determines whether or not departure alert information is received from server 100. If the departure alert information is received (YES at S314), the process is moved on to S316. If not (NO at S314), the process is moved on to S318.

At S316, CPU 302 displays the received departure alert information onto display unit 306. It is noted that, in the process at S316, the departure alert information is displayed on display unit 306, and/or voice data created by synthetic voice is output onto voice I/O unit 312. The alert is more effective when it is performed together with sound operation of a ringing tone at the time of a call reception.

At S318, CPU 302 determines whether or not traveling alert information is received from server 100. If the traveling alert information is received (YES at S318), the process is moved on to S320. If not (NO at S318), the process is moved on to S322.

At S320, CPU 302 displays the traveling alert information onto display unit 306. It is noted that the process at S320 includes, as in the process performed at S316 described above, displaying of departure alert information onto display unit 306, and outputting of voice data created by synthetic voice to voice I/O unit 312.

At S322, CPU 302 determines whether or not an instruction for stopping an information acquiring function is entered. The determination is performed by determining whether or not there is an entry of a prescribed key from operation unit 308. When the instruction for stopping the information acquiring function is entered (YES at S322), the information acquiring process is terminated. If not NO at S322), the process goes back to S300, where it is determined whether or not the acquisition request data is received from server 100.

The operation of the information providing system based on the above-described structure and flow chart will be described below.

The user of mobile phone 300 registers the user data shown in FIG. 4 when he/she receives information provided by the information providing system. The registration of the user data can be performed in the manner of an E-mail that is transmitted from mobile phone 300 to server 100 via wireless communication base station 200 and network 600. When the registration of user data shown in FIG. 4 is terminated, the user of mobile phone 300 enters the schedule data shown in FIG. 5. The entry of schedule data can also be performed, as in the case with the user data described above, by transmitting an E-mail from mobile phone 300 to server 100.

Server 100 transmits an acquisition request for positional information to mobile phone 300 at certain time intervals (e.g. 3minutes) (S100). If the telephone number and positional information (coordinate data) are received (YES at S202) by the time a certain period of time (e.g. 1 minute) has elapsed (NO at S204), server 100 reads out weather information of the location based on the received positional information (S102). Server 100 reads out the next plan from the schedule data shown in FIG. 5 based on the current time (S104).

From the coordinate data of the received current position, a search is conducted for a traveling route to the location where the next plan in the schedule data shown in FIG. 5 is executed (S106), and time of departure from the current position is calculated (S108). Spare time at the current position is calculated (S110), and an event satisfying a predetermined condition is searched for, from the event data shown in FIG. 6, based on the calculated spare time, the read weather information, the stored user's preference information, and the location information of the current position (S112).

If there is an event satisfying the search condition (YES at S114), event information is transmitted from server 100 to mobile phone 300 (S116). It is assumed in the description below that the user has moved from the current position acquired at S100 to the location where the event is held (a location that can be reached in approximately 15 minutes from the current position at S108), based on the event information.

If it is 15 minutes to the departure time calculated at S108 (YES at S118), the positional information is again acquired (S120). A search is again conducted for a traveling route from the current position to the location where the next plan is executed (S122), and the traveling route and traveling time retrieved as a result of the search are transmitted to mobile phone 300 (S124). Departure time for traveling to the location where the next plan is to be executed is calculated based on the newly acquired positional information (S126).

The traveling route and time as shown in FIG. 12 are retrieved based on the search condition for traveling route shown in FIG. 11, and the user is provided with event information based on the time of departure from the current position shown in FIG. 12. An example is described in which the user has moved to the current position shown in FIG. 13 based on the provided event information.

As shown in FIG. 12, when it is 15 minutes to the departure time of 18:40, i.e. at 18:25, a route is again searched for, and a new departure time is calculated as 18:30 as shown in FIG. 14. The search result shown in FIG. 14 is transmitted to mobile telephone 300 (S124).

When it is 10 minutes to the departure time (YES at S128), server 100 transmits departure alert information to mobile phone 300. At mobile phone 300 that has received the departure alert information, the received departure alert information is displayed on display unit 306, and/or synthetic voice is output from voice I/O unit 312 based on the received departure alert information. When the user departs toward a destination ("Shinjuku station" in this example) in accordance with the departure alert information, server 100 acquires positional information at predetermined time intervals (S132), and determines whether or not the traveling speed and traveling direction are correct. If the traveling speed or direction is incorrect (NO at S134), server 100 transmits traveling alert information to mobile phone 300 (S136). At mobile phone 300 that has received the traveling alert information, the received traveling alert information is displayed on display unit 306, and/or synthetic voice is output from voice I/O unit 312 based on the received traveling alert information. Such transmission of traveling alert information is repeated until the user arrives at the location where the next plan is executed, to guide the user of mobile telephone 300.

As described above, in the information providing system according to the present embodiment, the mobile phone transmits the current position to the server in response to an inquiry from the server. The server transmits, to the mobile phone, information related to traveling for the user of the mobile phone to execute a plan, based on the received information of the current position of the mobile phone and the stored schedule data. Thus, the mobile phone can display the information about traveling from the current position to the location where the next plan is executed (traveling route and traveling time). Moreover, if there is spare time between the current time and the time of departure from the current position based on the retrieved traveling route, a search is conducted for an appropriate event in accordance with the user's preference information, the weather of the current position, spare time, and the positional data of the current position, and the result of the search is transmitted to the mobile phone. Therefore, the information providing system can be implemented providing information that is related to the current position of the user and that is related to an activity of the user.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information providing system, comprising a mobile terminal and an information providing device,
    said mobile terminal including:
    a communication circuit communicating with said information providing device,
    a detection circuit detecting a position of said mobile terminal,
    an output circuit outputting information, and
    a control circuit connected to said communication circuit, said detection circuit and said output circuit, and controlling said mobile terminal,
    said control circuit including a circuit controlling said detection circuit and said communication circuit such that positional information representing a position of said mobile terminal is transmitted to said information providing device,
    said information providing device including:
    a communication circuit communicating with said mobile terminal,
    a first storage circuit storing schedule information representing a schedule to be executed by a user of said mobile terminal, and
    a control circuit connected to said communication circuit and said first storage circuit, and controlling said information providing device,
    said control circuit of said information providing device including a circuit controlling said communication circuit such that information related to an activity for executing said schedule is transmitted to said mobile terminal, based on said positional information received from said mobile terminal and said schedule information stored in said first storage circuit, and
    said control circuit of said mobile terminal further including a circuit controlling said output circuit such that the information related to the activity for executing said schedule received from said information providing device is output,
    said second storage circuit stores a detail of the event, and said information providing device further includes:
    a third storage circuit storing preference information representing a preference of said user, wherein,
    said circuit conducting a search conducts a search for an event that can be executed by a user of said mobile terminal from a degree of matching between said preference information and said detail of the event.

2. The information providing system according to claim 1, wherein
    said circuit conducting a search for an event that can be executed by an user of said mobile terminal from a degree of matching between said weather information and said weather suitable for the event.

3. The information providing system according to claim 1, wherein
    said information providing device further includes
    a weather search circuit searching for weather information representing weather, and
    said second storage circuit storing weather suitable for the event, and
    said control circuit of said information providing device further includes
    a weather circuit searching for weather information representing weather at a position specified by said positional information, using said weather search circuit, and
    wherein:
    said schedule information includes location information representing an execution location where said schedule is executed and time information representing execution time at which said schedule is executed, and
    said control circuit of said information providing device includes:
    a circuit conducting a search for a route of traveling from a position of said mobile terminal to said execution location, based on said positional information and said location information,
    a circuit calculating time required for said traveling, based on said execution time and said route, and
    a circuit controlling said communication circuit such that information representing said route of traveling and information representing said time required for traveling are transmitted to said mobile terminal,
    wherein
    said information providing device further includes a second storage circuit storing event information in connection with a location where an event is held and time required for execution of the event, and
    said control circuit of said information providing device further includes
    a circuit calculating spare time before start of traveling, based on said time required for traveling,
    a circuit conducting a search for an event that can be executed by a user of said mobile terminal, from event information stored in said second storage circuit, based on said spare time, said positional information, said location where the event is held, and said time required for execution of the event, and
    a circuit controlling said communication circuit such that event information representing the event retrieved as a result of said search is transmitted to said mobile terminal.

4. An information providing device used in an information providing system including a mobile terminal and an information providing device, wherein,
    said mobile terminal transmits positional information representing a position of said mobile terminal to said information providing device, and outputs information received from said information providing device,
    said information providing device comprises:
    a communication circuit communicating with said mobile terminal, a first storage circuit storing schedule information representing a schedule to be executed by a user of said mobile terminal, and a control circuit connected to said communication circuit and said first storage circuit, and controlling said information providing device, and said control circuit includes a circuit controlling said communication circuit such that information related to an activity for executing said schedule is transmitted to said mobile terminal, based on said positional information received from said mobile terminal and said schedule infonnation stored in said first storage circuit, wherein, said schedule information includes location information representing an execution location where said schedule is executed and time information representing execution time at which said schedule is executed, and said control circuit includes:

a circuit searching for a route of traveling from the position of said mobile temiinal to said execution location, based on said positional information and said location information, a circuit calculating time required for said traveling, based on said execution time and said route, and a circuit controlling said communication circuit such that information representing said route of traveling and information representing said time required for traveling are transmitted to said mobile tennninal; and further comprising:

a second storage circuit storing event information in connection with a location where an event is held and time required for execution of the event, said control circuit further including a circuit calculating spare time before start of traveling based on time required for said traveling, a circuit conducting a search for an event that can be executed by a user of said mobile terminal, from the event information stored in said second storage circuit, based on said spare time, said positional information, said location where the event is held, and said time required for execution of the event, and a circuit controlling said communication circuit such that event information representing the event retrieved as a result of said search is transmitted to said mobile terminal.

5. The information providing device according to claim 4, wherein:

said second storage circuit stores a detail of the event, and said information providing device further includes:

a third storage circuit storing preference information representing a preference of said user, and said circuit conducting a search conducts a search for an event that can be executed by a user of said mobile terminal from a degree of matching between said preference information and said detail of the event.

6. The information providing device according to claim 4, further comprising:

a weather search circuit searching for weather information representing weather, and said second storage circuit storing weather suitable for the event, said control circuit further including a weather circuit searching for weather information representing weather at a position specified by said positional information, using said weather search circuit, and said circuit conducting a search for an event that can be executed by a user of said mobile terminal, from a degree of matching between said weather information and said weather suitable for the event.

7. An information providing system, comprising a mobile terminal and an information providing device, said mobile terminal including:

a communication means for communicating with said information providing device, a detection means for detecting a position of said mobile terminal, an output means for outputting information, and a control means connected to said communication means, said detection means and said output means, for controlling said mobile terminal, said control means including a means for controlling said detection means and said communication means such that positional infonnation representing a position of said mobile terminal is transmitted to said information providing device, said information providing device including a communication means for communicating with said mobile terminal, a first storage means for storing schedule information representing a schedule to be executed by a user of said mobile terminal, and a control means connected to said communication means and said first storage means, for controlling said information providing device, said control means of said information providing device including a means for controlling said communication means such that information related to an activity for executing said schedule is transmitted to said mobile terminal, based on said positional information received from said mobile terminal and said schedule information stored in said first storage means, and said control means of said mobile terminal further including a nieans for controlling said output means such that the information related to the activity for executing said schedule, received from said information providing device, is output, wherein, said schedule information includes location information representing an execution location where said schedule is executed, and time information representing execution time at which said schedule is executed, and said control means of said information providing device includes:

a means for searching for a route of traveling from a position of said mobile terminal to said execution location, based on said positional information and said location information, a means for calculating time reciuired for said traveling, based on said execution time and said route, and a means for controlling said communication means such that information representing said route of traveling and information representing said time reciuired for traveling are transmitted to said mobile terminal, wherein said information providing device further includes a second storage means for storing event information in connection with a location where an event is held and time required for execution of the event, and said control means of said information providing device further includes a means for calculating spare time before start of traveling, based on said time required for traveling, a means for conducting a search for an event that can be executed by a user of said mobile terminal, from the event information stored in said second storage means, based on said spare time, said positional information, said location where the event is held, and said time required for execution of the event, and a means for controlling said communication nieans such that event information representing the event retrieved as a result of said search to said mobile terminal.

8. The information providing system according to claim 7, wherein said second storage means stores a detail of the event, and said information providing device further includes:

a third storage means for storing preference information representing a preference of said user, wherein said means for conducting a search conducts a search for an event that can be executed by a user of said mobile terminal from a degree of matching between said preference information and said detail of the event.

9. The information providing system according to claim 7, wherein said information providing device further includes a weather search means for searching for weather information representing weather, and said second storage means for storing weather suitable for the event, and said control means of said information providing device further includes a weather searching means for searching for weather information representing weather at a position specified by said positional information, using said weather search means, said means for conducting a search for an event that can be executed by a user of said mobile terminal from a degree of matching between said weather information and said weather suitable for the event.

10. An information providing device used in an information providing system including a mobile terminal and the information providing device, wherein:

said mobile terminal transmits positional information representing a position of said mobile terminal to said information providing device, and outputs information received from said information providing device, said information providing device further includes:

a communication means for communicating with said mobile terminal, a first storage means for storing schedule information representing a schedule to be executed by a user of said mobile terminal, and a control means connected to said communication means and said first storage means, for controlling said information providing device, and said control means includes a means for controlling said communication means such that information related to an activity for executing said schedule is transmitted to said mobile terminal, based on said positional information received from said mobile terminal and said schedule information stored in said first storage means, said schedule information includes location information representing an execution location where said schedule is executed, and time information representing execution time at which said schedule is executed, and said control means includes:

a means for searching for a route of traveling from a position of said mobile terminal to said execution location, based on said positional information and said location information, a means for calculating time required for said traveling, based on said execution time and said route, and a means for controlling said communication means such that information representing said route of traveling and information representing said time required for traveling are transmitted to said mobile terminal, and further comprising a second storage means for storing event information in connection with a location where an event is held and time required for execution of the event, said control means further including a means for calculating spare time before start of traveling, based on said time required for traveling, a means for conducting a search for an event that can be executed by a user of said mobile terminal, from the event information stored in said second storage means, based on said spare time, said positional infonnation, said location where the event is held, and said time required for execution of the event, and a means for controlling said communication means such that event information representing the event retrieved as a result of said search is transmitted to said mobile terminal.

11. The information providing device according to claim 10, wherein:

said second storage means stores a detail of the event, and said information providing device further includes, a third storage means for storing preference information representing a preference of said user, and said means for conducting a search conducts a search for an event that can be executed by a user of said mobile terminal from a degree of matching between said preference information and said detail of the event.

12. The information providing device according to claim 10, further comprising:

a weather search means for searching for weather information representing weather, and said second storage means for storing weather suitable for the event, said control means further including a weather searching means for searching for weather information representing weather at a position specified by said positional information, using said weather search means, and, said means for conducting a search conducts a search for an event that can be executed by a user of said mobile terminal from a degree of matching between said weather information and said weather suitable for the event, 13. An information providing method providing a mobile terminal with information, comprising the steps of:

preparing schedule information representing a schedule to be executed by a user of said mobile terminal, receiving positional information representing a position of said mobile terminal from said mobile terminal, generating information related to an activity for executing said schedule, based on said positional information received at said step of receiving the positional information and based on said schedule information prepared at said step of preparing the schedule information, and transmitting said information related to the activity generated at said step of generating information related to the activity to said mobile terminal, said schedule information includes location information representing an execution location where said schedule is executed and time information representing execution time at which said schedule is executed,
said step of generating information related to the activity includes the steps of:
searching for a route of traveling from the position of said mobile terminal to said execution location, based on said positional information and said location information, and
calculating time required for said traveling, based on said execution time and said route, and
said step of transmitting information related to the activity includes the step of transmitting, to said mobile terminal, information representing said route of traveling and information representing said time required for said traveling,
further comprising the step of preparing event information in connection with a location where an event is held and time required for execution of the event,
said step of generating information related to the activity further including the steps of
calculating spare time before start of traveling based on time required for said traveling, and
conducting a search for an event that can be executed by a user of said mobile terminal, from said prepared event information, based on said spare time, said positional information, said location where the event is held and said time required for execution of the event,
said step of transmitting information related to the activity further including the step of transmitting event information representing the event retrieved as a result of said search to said mobile terminal.

14. The information providing method according to claim 13, further comprising the steps of:
preparing event information in connection with a detail of the event, and
preparing preference information representing a preference of said user,
said step of generating information related to the activity further including the step of
conducting a search for an event that can be executed by a user of said mobile terminal, from said prepared event information, based on a degree of matching between said preference information and said detail of the event.

15. The information providing method according to claim 13, further comprising the step of preparing event information in connection with weather suitable for the event,
said step of generating information related to the activity further including the steps of
searching for weather information representing weather at a position specified by said positional information,
conducting a search for an event that can be executed by a user of said mobile terminal, from said prepared event information, based on a degree of matching between said weather information and said weather suitable for the event.

16. A computer-readable recording medium in which a program implementing an information providing method providing a mobile terminal with information is recorded, wherein:
said information providing method includes the steps of:
preparing schedule information representing a schedule to be executed by a user of said mobile terminal,
receiving positional information representing a position of said mobile terminal from said mobile terminal,
generating information related to an activity for executing said schedule, based on said positional information received at said step of receiving the positional information and based on said schedule information prepared at said step of preparing the schedule information, and
transmitting, to said mobile terminal, said information related to the activity generated at said step of generating information related to the activity, wherein,
said schedule information includes location information representing an execution location where said schedule is executed and time information representing execution time at which said schedule is executed,
said step of generating information related to the activity includes the steps of:
searching for a route of traveling from the position of said mobile terminal to said execution location, based on said positional information and said location information, and
calculating time required for said traveling based on said execution time and said route, and
said step of transmitting information related to the activity includes the step of transmitting, to said mobile terminal, information representing said route of traveling and information representing said time required for traveling, wherein
said information providing method further includes the step of preparing event information in connection with a location where an event is held and time required for execution of the event,
said step of generating information related to the activity further includes the steps of
calculating spare time before start of traveling, based on said time required for traveling, and
conducting a search for an event that can be executed by a user of said mobile terminal, from said prepared event information, based on said spare time, said positional information, said location where the event is held, and said time required for execution of the event, and
said step of transmitting said information related to the activity further includes the step of transmitting event information representing the event retrieved as a result of said search to said mobile terminal.

17. The recording medium according to claim 16, wherein said information providing method further includes the steps of
preparing event information in connection with a detail of the event, and
preparing preference information representing a preference of said user,
said step of generating information related to the activity further includes the step of
conducting a search for an event that can be executed by a user of said mobile terminal, from said prepared event information based on a degree of matching between said preference information and said detail of the event.

18. The recording medium according to claim 16, wherein said information providing method further includes the step of preparing event information in connection with weather suitable for the event,
said step of generating information related to the activity further includes the steps of
searching for weather information representing weather at a position specified by said positional information, and
conducting a search for an event that can be executed by a user of said mobile terminal, from said prepared event information, based on a degree of matching between said weather information and said weather suitable for the event.

19. A method of providing information to a mobile terminal comprising the steps of:
  storing a schedule comprising at least one entry including a location and a time for the user to be at the location;
  receiving positional information of the mobile terminal;
  determining, from the at least one entry and a current time, a departure time at which travel to the location of the at least one entry must commence;
  determining an amount of free time available before the departure time;
  searching for an event based on the positional infomiation of the mobile terminal and the determined free time; and
  if an event is found, transmitting information concerning the event to the mobile terminal.

20. The method of claim 19 wherein said step of searching for an event comprises searching for an event based on an indicated preference of the user.

21. The method of claim 19 wherein said step of searching for an event comprises searching for an event based on a previously saved preference of the user that can be completed within the free time.

22. The method of claim 19 including the additional step of determining a route from the position of the mobile unit to the location of the at least one event.

* * * * *

UNITED STATES PATENT AND TRADEMARK OFFICE
CERTIFICATE OF CORRECTION

| | |
|---|---|
| PATENT NO. | : 7,266,376 B2 |
| APPLICATION NO. | : 09/987143 |
| DATED | : September 4, 2007 |
| INVENTOR(S) | : Katsuya Nakagawa |

It is certified that error appears in the above-identified patent and that said Letters Patent is hereby corrected as shown below:

Replace claims 1-3 (column 13, line 22 – column 14, line 57) with the following:

--1. An information providing system, comprising a mobile terminal and an information providing device, said mobile terminal including:

a communication circuit communicating with said information providing device, a detection circuit detecting a position of said mobile terminal, an output circuit outputting information, and a control circuit connected to said communication circuit, said detection circuit and said output circuit, and controlling said mobile terminal, said control circuit including a circuit controlling said detection circuit and said communication circuit such that positional information representing a position of said mobile terminal is transmitted to said information providing device, said information providing device including:

a communication circuit communicating with said mobile terminal, a first storage circuit storing schedule information representing a schedule to be executed by a user of said mobile terminal, and a control circuit connected to said communication circuit and said first storage circuit, and controlling said information providing device, said control circuit of said information providing device including a circuit controlling said communication circuit such that information related to an activity for executing said schedule is transmitted to said

UNITED STATES PATENT AND TRADEMARK OFFICE
CERTIFICATE OF CORRECTION

PATENT NO.         : 7,266,376 B2
APPLICATION NO. : 09/987143
DATED                  : September 4, 2007
INVENTOR(S)       : Katsuya Nakagawa It is certified that error appears in the above-identified patent and that said Letters Patent is hereby corrected as shown below:

mobile terminal, based on said positional information received from said mobile terminal and said schedule information stored in said first storage circuit, and said control circuit of said mobile terminal further including a circuit controlling said output circuit such that the information related to the activity for executing said schedule received from said information providing device is output, wherein:

said schedule information includes location information representing an execution location where said schedule is executed and time information representing execution time at which said schedule is executed, and said control circuit of said information providing device includes:

a circuit conducting a search for a route of traveling from a position of said mobile terminal to said execution location, based on said positional information and said location information, a circuit calculating time required for said traveling, based on said execution time and said route, and a circuit controlling said communication circuit such that information representing said route of traveling and information representing said time required for traveling are transmitted to said mobile terminal, wherein said information providing device further includes a second storage circuit storing event information in connection with a location where an event is held and time required for execution of the event, and said control circuit of said information providing device further includes:

UNITED STATES PATENT AND TRADEMARK OFFICE
CERTIFICATE OF CORRECTION

| | | |
|---|---|---|
| PATENT NO. | : 7,266,376 B2 | |
| APPLICATION NO. | : 09/987143 | |
| DATED | : September 4, 2007 | |
| INVENTOR(S) | : Katsuya Nakagawa | |

It is certified that error appears in the above-identified patent and that said Letters Patent is hereby corrected as shown below:

a circuit calculating spare time before start of traveling, based on said time required for traveling, a circuit conducting a search for an event that can be executed by a user of said mobile terminal, from event information stored in said second storage circuit, based on said spare time, said positional information, said location where the event is held, and said time required for execution of the event, and a circuit controlling said communication circuit such that event information representing the event retrieved as a result of said search is transmitted to said mobile terminal.

2. The information providing system according to claim 1, wherein said second storage circuit stores a detail of the event, and said information providing device further includes:

a third storage circuit storing preference information representing a preference of said user, wherein, said circuit conducting a search conducts a search for an event that can be executed by a user of said mobile terminal from a degree of matching between said preference information and said detail of the event.

3. The information providing system according to claim 1, wherein said information providing device further includes a weather search circuit searching for weather information representing weather, and said second storage circuit storing weather suitable for the event, and

UNITED STATES PATENT AND TRADEMARK OFFICE
CERTIFICATE OF CORRECTION

PATENT NO. : 7,266,376 B2
APPLICATION NO. : 09/987143
DATED : September 4, 2007
INVENTOR(S) : Katsuya Nakagawa It is certified that error appears in the above-identified patent and that said Letters Patent is hereby corrected as shown below:

said control circuit of said information providing device further includes a weather circuit searching for weather information representing weather at a position specified by said positional information, using said weather search circuit, and said circuit conducting a search for an event that can be executed by an user of said mobile terminal from a degree of matching between said weather information and said weather suitable for the event.--.

In Claim 4 (column 15, line 12) change "infonnation" to --information--; and (column 15, line 20) change "temiinal" to --terminal--.

In Claim 7 (column 16, line 38) change "njeans" to --means--; (column 16, line 57) change "reciuired" to --required--; (column 17, line 7) change "nieans" to --means--.

In Claim 10 (column 18, line 17) change "infonnation" to --information--.

In Claim 12 (column 18, line 50) at the end of the claim, after "event" insert a period (--.--).

In Claim 16 (column 20, line 40) change "infonnation" to --information--.

Signed and Sealed this

Twenty-fifth Day of November, 2008

JON W. DUDAS
*Director of the United States Patent and Trademark Office*